United States Patent [19]
Scott

[11] Patent Number: 6,084,885
[45] Date of Patent: Jul. 4, 2000

[54] APPARATUS AND METHOD FOR DSP SHARING USING STATISTICAL PROPERTIES OF DATA

[75] Inventor: Robert E. Scott, Largo, Fla.

[73] Assignee: Paradyne Corporation, Largo, Fla.

[21] Appl. No.: 09/027,705

[22] Filed: Feb. 23, 1998

Related U.S. Application Data

[60] Provisional application No. 60/038,860, Feb. 26, 1997.

[51] Int. Cl.$^7$ .......................... H04L 12/403; H04L 12/42
[52] U.S. Cl. ........................ 370/455; 379/88.07
[58] Field of Search ................... 370/449, 455, 370/432, 444, 503, 519, 469; 375/221, 350, 268, 320, 219, 220; 379/88.07, 92.01, 92.03, 92.04, 93.01, 93.07, 93.09, 93.31, 112, 100.13

[56] References Cited

U.S. PATENT DOCUMENTS

| | | | |
|---|---|---|---|
| 4,637,035 | 1/1987 | Betts | 375/8 |
| 4,670,874 | 6/1987 | Sato et al. | 370/110.1 |
| 4,797,878 | 1/1989 | Armstrong | 370/96 |
| 4,868,824 | 9/1989 | Golden | 395/181 |
| 4,955,019 | 9/1990 | Mizuhara et al. | 370/85.7 |
| 4,995,057 | 2/1991 | Chung | 375/350 |
| 5,043,982 | 8/1991 | Werner | 370/519 |
| 5,311,578 | 5/1994 | Bremer et al. | 379/97 |
| 5,404,351 | 4/1995 | Inoue | 370/24 |
| 5,438,614 | 8/1995 | Rozman et al. | 379/93.08 |
| 5,515,429 | 5/1996 | Kawada et al. | 370/216 |
| 5,644,573 | 7/1997 | Bingham et al. | 370/503 |
| 5,668,857 | 9/1997 | McHale | 379/93.07 |
| 5,680,394 | 10/1997 | Bingham et al. | 370/503 |
| 5,684,825 | 11/1997 | Ko | 375/222 |
| 5,796,742 | 8/1998 | Klotzbach et al. | 370/469 |
| 5,898,761 | 4/1999 | McHale et al. | 379/93.01 |
| 5,910,970 | 6/1999 | Lu | 375/377 |

*Primary Examiner*—Dang Ton
*Assistant Examiner*—Phirin Sam
*Attorney, Agent, or Firm*—Thomas, Kayden, Horstemeyer & Risley, LLP

[57] ABSTRACT

A modem apparatus and method to allow a single central site modem with a low processing power DSP to handle numerous DSL lines. More particularly, the modem apparatus and method take advantage of the bursty nature of Internet data traffic to allow the low processing power DSP equipped modem to handle multiple lines simultaneously. The multiple lines can be serviced via a round robin routine or via a quality of service routine, in which the data traffic on the line is analyzed for real time activity, such analysis using UDP transport layer protocol to determine real time activity. The quality of service routine also constantly monitors the data communications lines during periods of data communication to determine if a data line should be entered into the high priority queue.

14 Claims, 10 Drawing Sheets

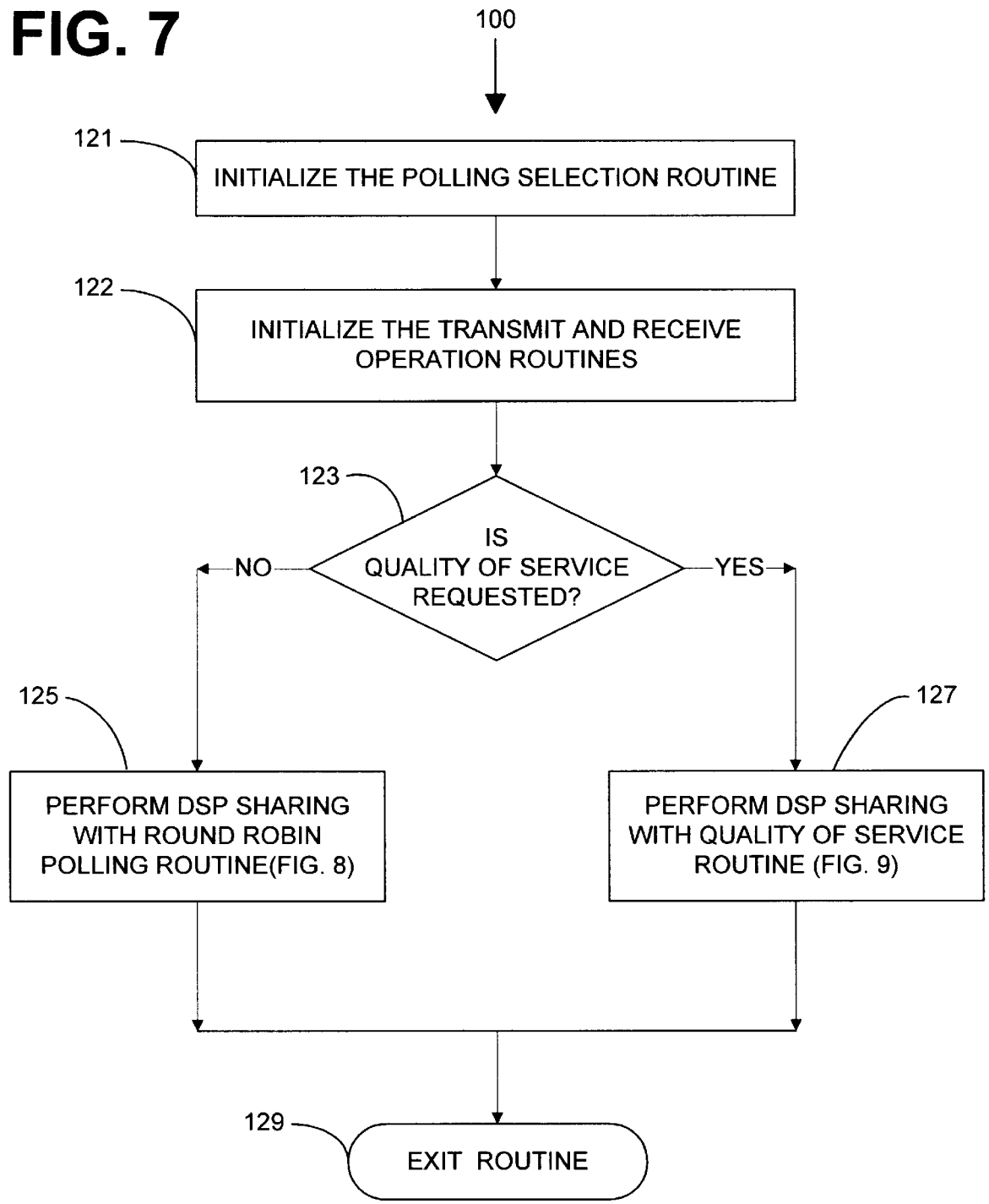

APPARATUS AND METHOD FOR DSP SHARING USING STATISTICAL PROPERTIES OF DATA

CROSS REFERENCE TO RELATED APPLICATIONS

This application claims benefit to provisional patent application Ser. No. 60/038,860 filed Feb. 26, 1997.

BACKGROUND OF THE INVENTION

1. Field of the Invention

The present invention generally relates to an apparatus and method for allowing a single central site modem with a low processing power digital signal processor (DSP) to handle numerous digital subscriber lines (DSL). The modem apparatus and method takes advantage of the bursty nature of Internet data traffic to allow the low processing power DSP-equipped modem to handle multiple lines simultaneously.

2. Background of Related Art

As known in the art, some modems can utilize a single processor to control multiple lines. However, these modems require that the single DSP processor be fast and powerful enough to support all the multiple lines at one time. An example of this configuration is described in the commonly assigned U.S. Pat. No. 4,637,035 (hereby incorporated by reference), which shows a single processor that can control multiple lines. However, this patent requires that the single-DSP processor have enough processing power to support all the multiple lines that are attached because each line requires that the modulation be constantly active.

Heretofore, modems have lacked the ability to couple multiple local loops to a single DSP, wherein this DSP has less processing power than that needed to handle all the local loops simultaneously. This DSP can take advantage of the "bursty" nature of Internet data traffic to allow every user to achieve full throughput.

Also, as known in the art, some modems can utilize "modem pooling" and "oversubscription" to allow a smaller number of modems to handle a larger number of local loops. An example of this technology is described in the commonly assigned U.S. Pat. No. 5,668,857, which shows a plurality of modems handling a larger plurality of local loops and which is incorporated herein by reference. Modem pooling is premised upon the philosophy that not all users desire to be connected at the same time. However, once connected, the modems will always modulate a signal on the line—whether data is being transferred or not. These modem pools cannot take advantage of the "bursty" nature of Internet data traffic. Modem pools also suffer from the problem that a user will receive a "busy" indication—and not receive a connection—if the number of users attempting to connect at the same time exceeds the "oversubscription" ratio.

Modem pools also make use of complete modems—each modem having a complete analog front end and bit pump processor. Complicated analog switching is used to switch the local loops to the appropriate modem. This type of switching is subject to noise floor problems. These modem pools cannot use a plurality of local loops that are connected to a single DSP via robust digital switching.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentality's and combinations particularly pointed out in the appended claims.

To achieve the advantages and novel features, the present invention is generally directed to a data communications apparatus and method that take advantage of the bursty nature of Internet data traffic to allow a low processing power DSP utilized in a central-site modem to handle multiple lines. This modem's processing power would normally be too low to handle all these simultaneous lines without the apparatus and method of the present invention.

One embodiment of the present invention includes an apparatus for servicing multiple analog lines to be input and converted to digital signals. Because multiple analog input lines are permitted, the modem apparatus utilizes multiples of analog plain old telephone system (POTS) interface hardware, data access arrangement (DAA) logic, analog to digital (A/D), and digital to analog (D/A) logic.

The modem apparatus used in this embodiment includes a memory containing a plurality of program routine sequences and a DSP processor that performs the selected program routine sequences. These sequences include transmission of multiple polls and reception of multiple Responses, the number of simultaneously-active polls and responses being less than the total number of local loops supported. The polling routine allows every user to receive full data throughput under typical Internet data conditions. For those times when data traffic exceeds the bandwidth of the DSP, a "quality of service" polling routine assures that real-time applications are serviced first.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 6 B shows a poll with user data, followed by a response with no user data;

FIG. 6 C shows a poll with no user data, followed by a response with user data;

FIG. 6 D shows a Poll with user data, followed by a Response with user data.

FIG. 7 is a flow chart for selecting the type of polling algorithm (round robin or quality of service) in the DSP logic of FIG. 5.

Figure 1:
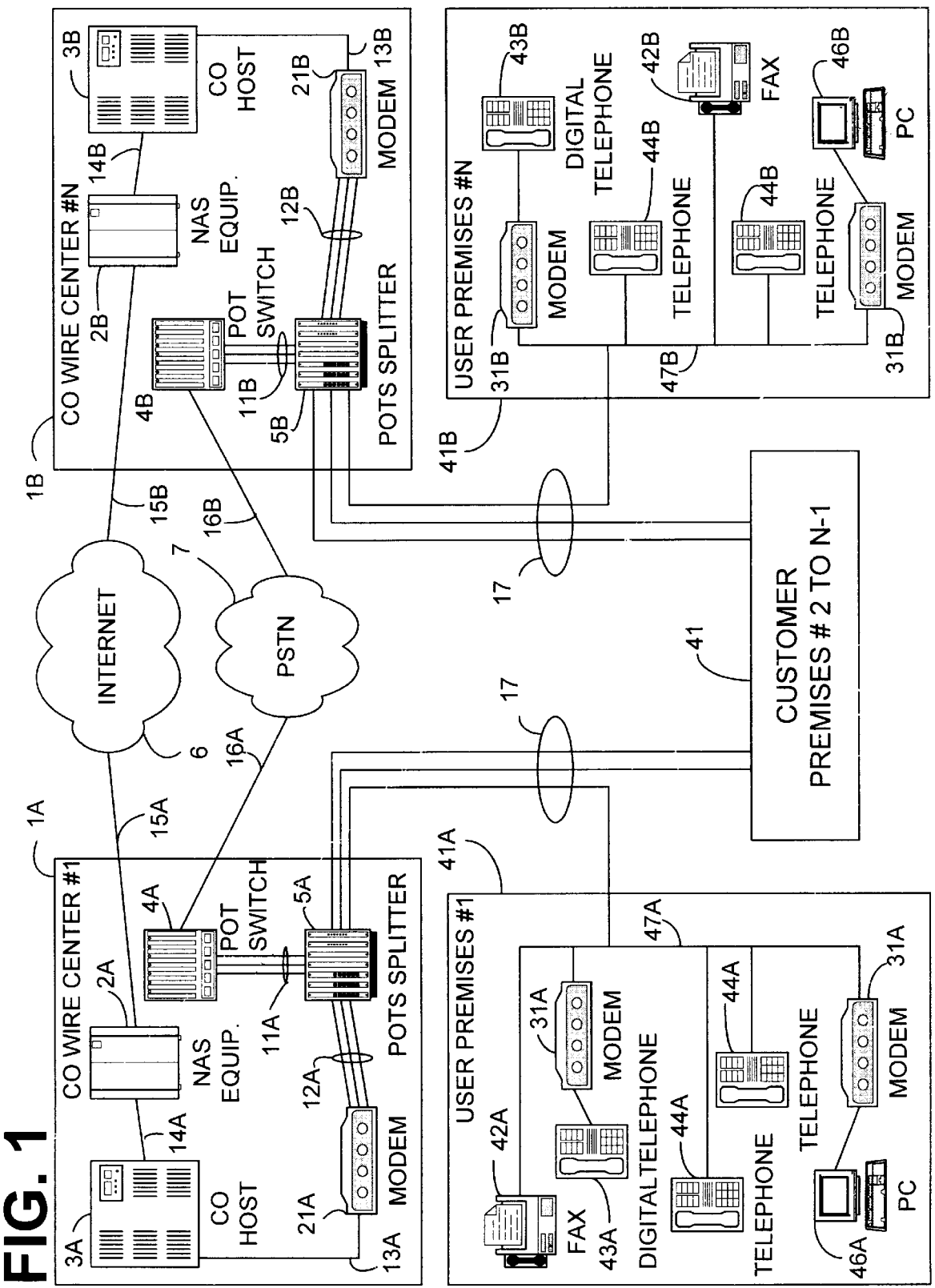
FIG. 1 is a view of the central office (CO) wire centers and user premises layout of the present invention.

Reference will now be made in detail to the description of the invention as illustrated in the drawings. While the invention will be described in connection with these drawings there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Having summarized the invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

FIG. 1 illustrates the plain old telephone system (POTS) networks including data communication modems 21A, 21B of the preferred embodiment. The data communication modems 21A, 21B include the apparatus and methods for supporting multiple users by taking advantage of the fact that most users do not transmit and receive data for the entire period of time that they are connected to the Internet—in other words, data usage on the Internet is "bursty". While the term "Internet" is used throughout this invention, those skilled in the art will recognize that the "bursty" nature of data usage applies to other networks as well.

The POTS network includes numerous user premises 41, wherein each user premises is connected to a central office wire center 1, via a subscriber line 17. Each subscriber line 17 is connected to the user premises 41, which further connects to a user premises line 47, for distribution of POTS service throughout the user premises 41. Usually, there are numerous POTS devices connected to each user premises line 47, such as telephones 44, facsimile machines 42, PC modems, and the like. It is also known (but not shown for simplicity) that it is possible to have multiple subscriber lines 17 connected to each user premises, thereby creating two separate user premises lines 47 within each user premises.

As noted previously, each user premises is connected via a subscriber line 17 to a central office wire center 1. The subscriber line 17 is connected to a POTS splitter device 5 that separates the analog POTS signals from data signals. The POTS signals are sent to a POTS switch 4 that is connected to the other central office wire centers 1, via the public switched telephone network (PSTN) 7. Modulated digital data signals separated from the POTS analog signals at POTS splitter 5 are connected to modems 21 within the central office wire center 1. Modems 21 are further connected to a central office host 3 for processing and transmission of data signals to network equipment 2, for connection with digital data networks, such as the Internet 6.

Since the above is a description of the present invention's applied system environment, a brief discussion of an example of the signals generated in the user premises and transmitted through the central office wire center 1 via either the PSTN 7 or Internet networks 6 and back to a user premises will now be detailed.

When a user desires to transmit data over a digital network via the user's personal PC, digital phone, digital fax, or the like, the digital signals from the digital device are transformed into analog signals via modulation by modem 31. The signals are transmitted over the user premises line 47 to the subscriber line 17 for final delivery to the local central office wire center 1. The digitally modulated analog signals going into POTS splitter 5 are separated from the analog POTS signals, and are directed to modems 21. Modems 21 demodulate the analog signals back to their original digital data signals. The modems 21 transmit the digital data signals to the CO host 3 for processing and transmission of the data signals to network equipment 2, for further transmission of the data signals over the Internet 6.

The digital data signals sent via the Internet 6 are received at the destination central office wire center 1 by the network access service equipment 2. The signals are transmitted to the central office host 3, for processing and transmission to the modems 21. The modems 21 modulate the digital signals into analog signals for transmission through the POTS splitter 5 and over destination subscriber line 17 to the destination user premises 41.

The modulated signals are received at the user premises line 47 for distribution to all equipment connected to the user premises distribution line. The modulated signals are demodulated within the destination modem 31 back to digital signals, which are transmitted to the digital device connected to the modem.

The modem apparatus used in this embodiment includes a memory containing a plurality of program routine sequences and a DSP processor that performs these routines.

Figure 2:
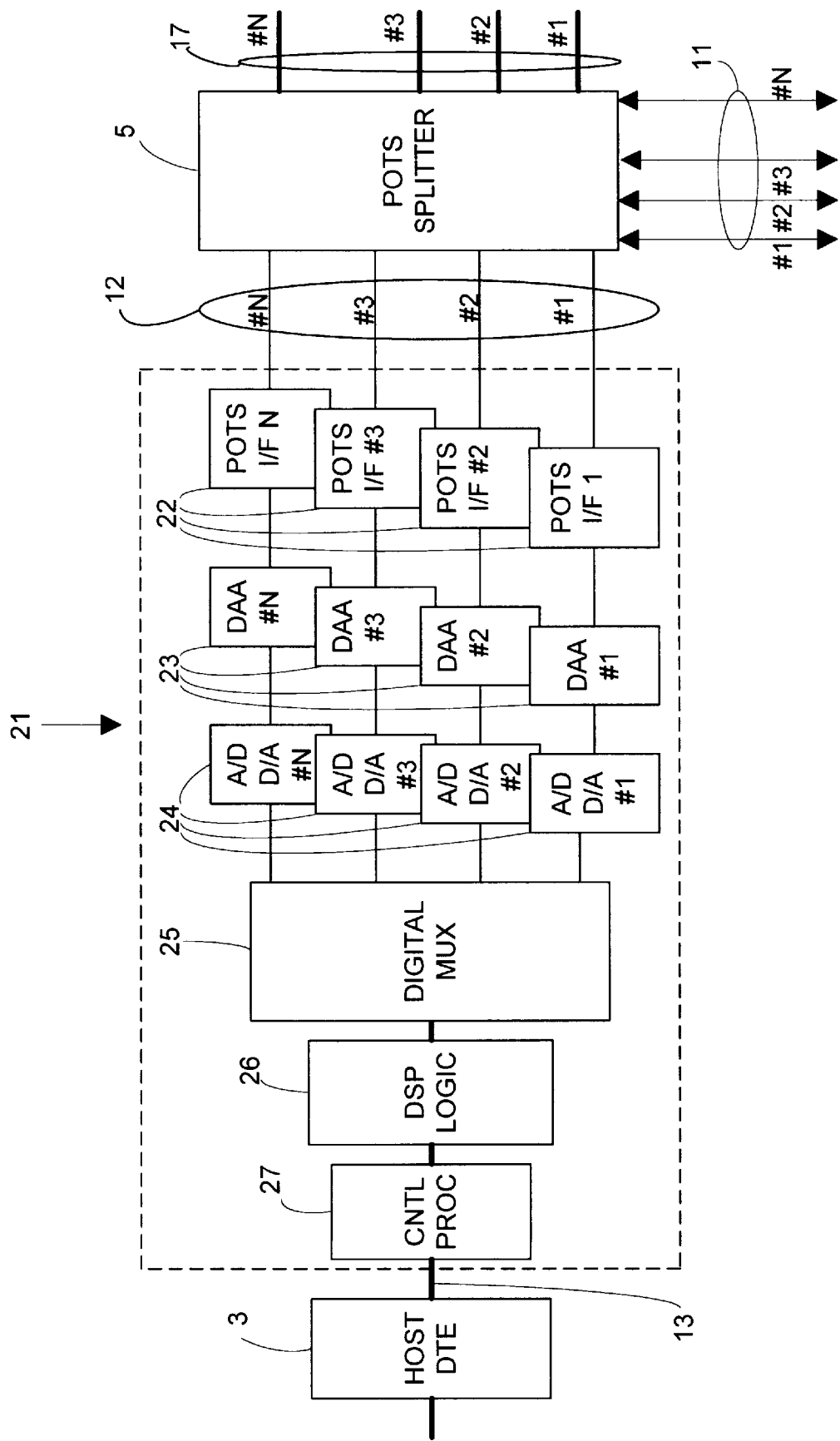
FIG. 2 is a block diagram of the CO modem and POTS splitter apparatuses of FIG. 1.

FIG. 2 is a block diagram of a CO wire center multichannel data communications device modem 21 constructed in accordance with the present invention. The typical configuration of the central wire office 1 multichannel data communication device 21 is connected, via a POTS splitter 5 (FIG. 1) to the subscriber lines 17. The analog signals output from POTS splitter 5 into the central office multichannel data communications device 21, are connected through communication links 12 into the numerous POTS interfaces 22 (1-N) in FIG. 2. The central office multichannel data communications device 21 provides for multiple analog lines 12 to be input and converted to digital signals, due to the efficiency of the DSP 26 within the central office multichannel data communication device 21 and the processor's ability to take advantage of the "bursty" nature of Internet data transmissions. Because multiple analog input lines are permitted, device 21 requires multiples of the analog POTS interface hardware 22, data access arrangement (DAA) logic 23 and A/D and D/A logic 24.

The analog POTS interface hardware 22 connects analog signal line 12 to the data access arrangement (DAA) logic 23. The data access arrangement (DAA) logic 23 provides surge protection, impedance matching, isolation, hybrid circuits, ring indicator and off-hook detector, and will be explained in detail hereinafter with reference to FIG. 3. The data access arrangement (DAA) logic 23 connects the analog signals to the A/D and D/A logic 24.

The A/D and D/A logic 24 modulates the digital data to an analog signal and demodulates the received analog signal back to a digital data signal. The A/D and D/A will be explained in detail hereinafter with reference to FIG. 4. The A/D and D/A logic 24 transmits the digital signal to the DSP logic 26 for reconstruction of the digital data. Multiple A/D and D/A logic 24 may be connected to a single DSP logic 26 via a digital mux 25.

DSP logic 26 reconstructs the digital signal streams into usable digital data by demodulating the analog signal. DSP logic 26 will be explained in detail hereinafter with reference to FIG. 6. The reconstructed digital data is transmitted from the DSP logic 26 to the control processor 27.

The control processor 27 performs high level control functions such as link layer processing, network management and other functions as is well known in the art. The control processor 27 passes digital data to the host data terminal equipment (DTE) 3. The host DTE 3 typically performs high level functions such as routing, switching, and other functions as is well known in the art.

Figure 3:
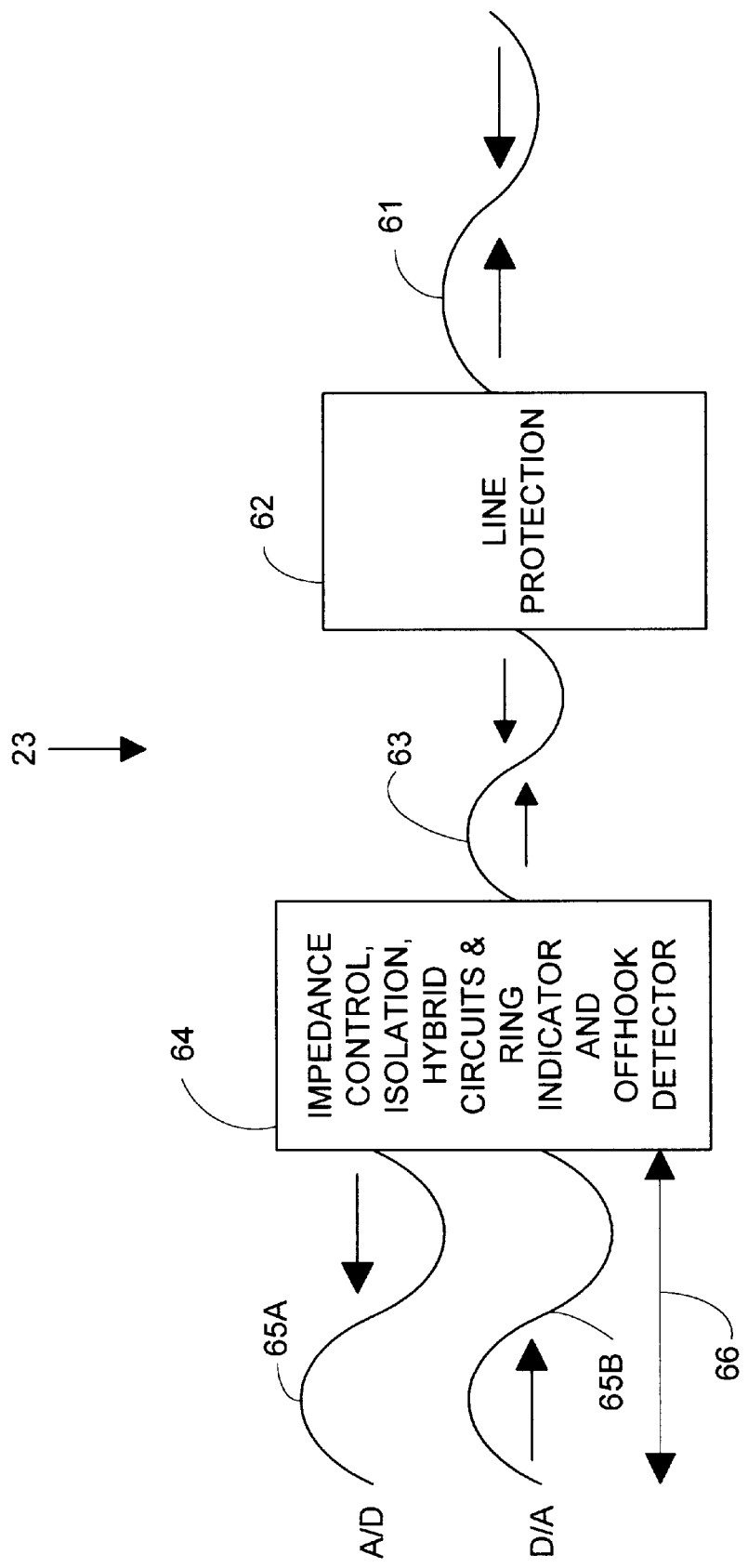
FIG. 3 is a block diagram of the data access arrangement of the POTS interface and modem apparatuses of FIG. 2.

Referring to FIG. 3, which is a block diagram of the DAA 23 of FIG. 2, the DAA 23 has an input/output analog communication port for bi-directional communications link 61. Analog communication link 61 is connected to a line protection circuit 62.

Line protection circuit 62 protects the multichannel communications device against line surges, lightning strikes, and the like. Line protection circuit 62 is then further connected to the impedance and isolation circuit 64, via communication link 63. The impedance and isolation circuit 64 also contains circuitry for a hybrid, ring indicator, and off-hook detector.

The impedance and isolation circuit 64 is comprised of an impedance matching circuit (not shown for simplicity) before being connected to the two-to-four wire hybrid interface (not shown for simplicity). The DAA logic 23 is connected via communication link 65 to A/D and D/A logic 24. Interface 66 carries control and status information to the DAA 23 block.

Figure 4:
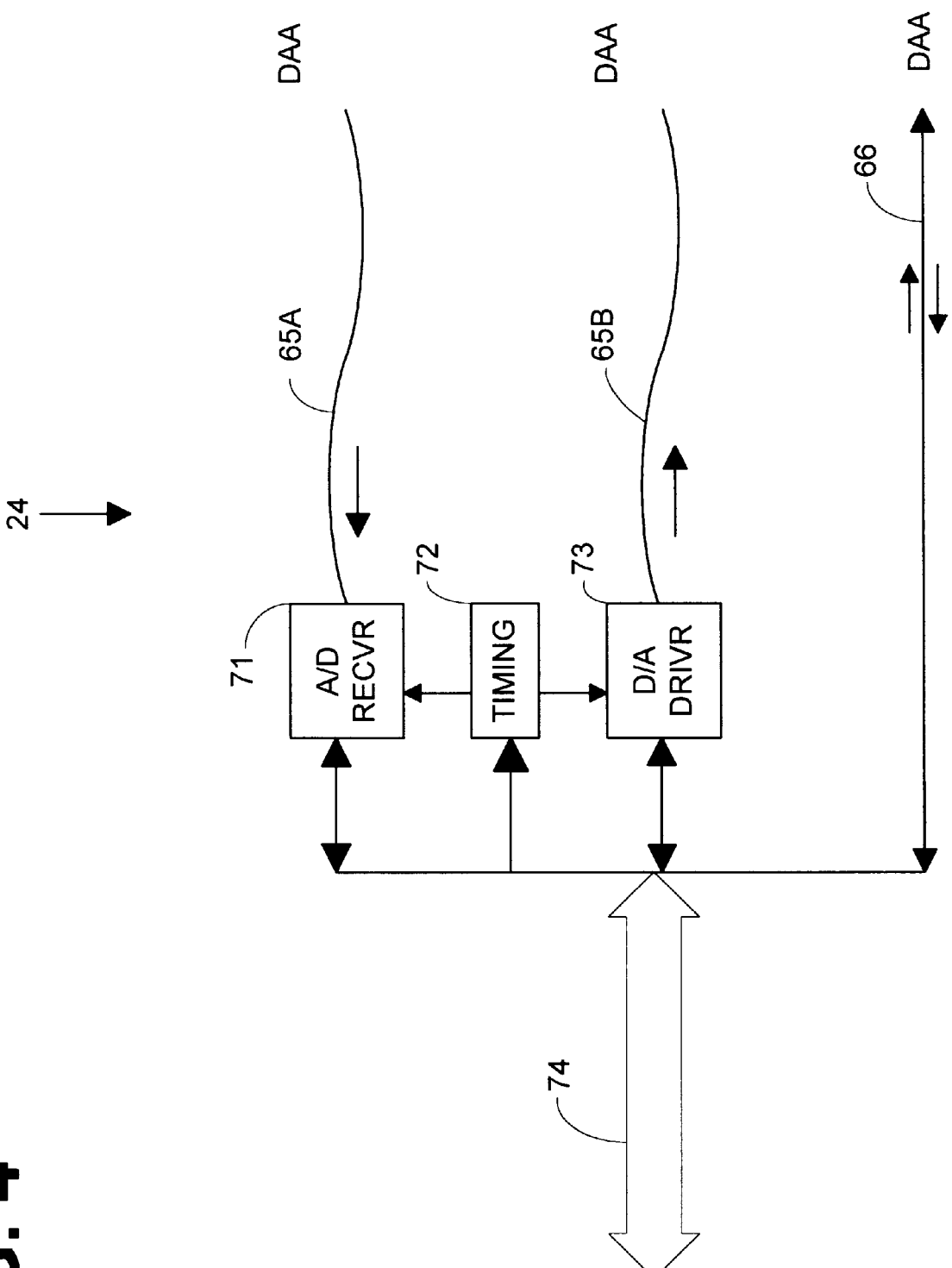
FIG. 4 is a block diagram of the A/D and D/A logic of FIG. 2.

With reference to FIG. 4, the A/D and D/A 24 is connected to communication link 65. A/D receiver 71 receives the analog signals and converts the analog signal by using an analog-to-digital converter. D/A 73 takes digital signals received from link 74 and converts them to analog signals for output on link 65. Interface 66, analog-to-digital converter 72, and digital-to-analog converter 73 are all connected to a bi-directional digital communication link 74.

Figure 5:
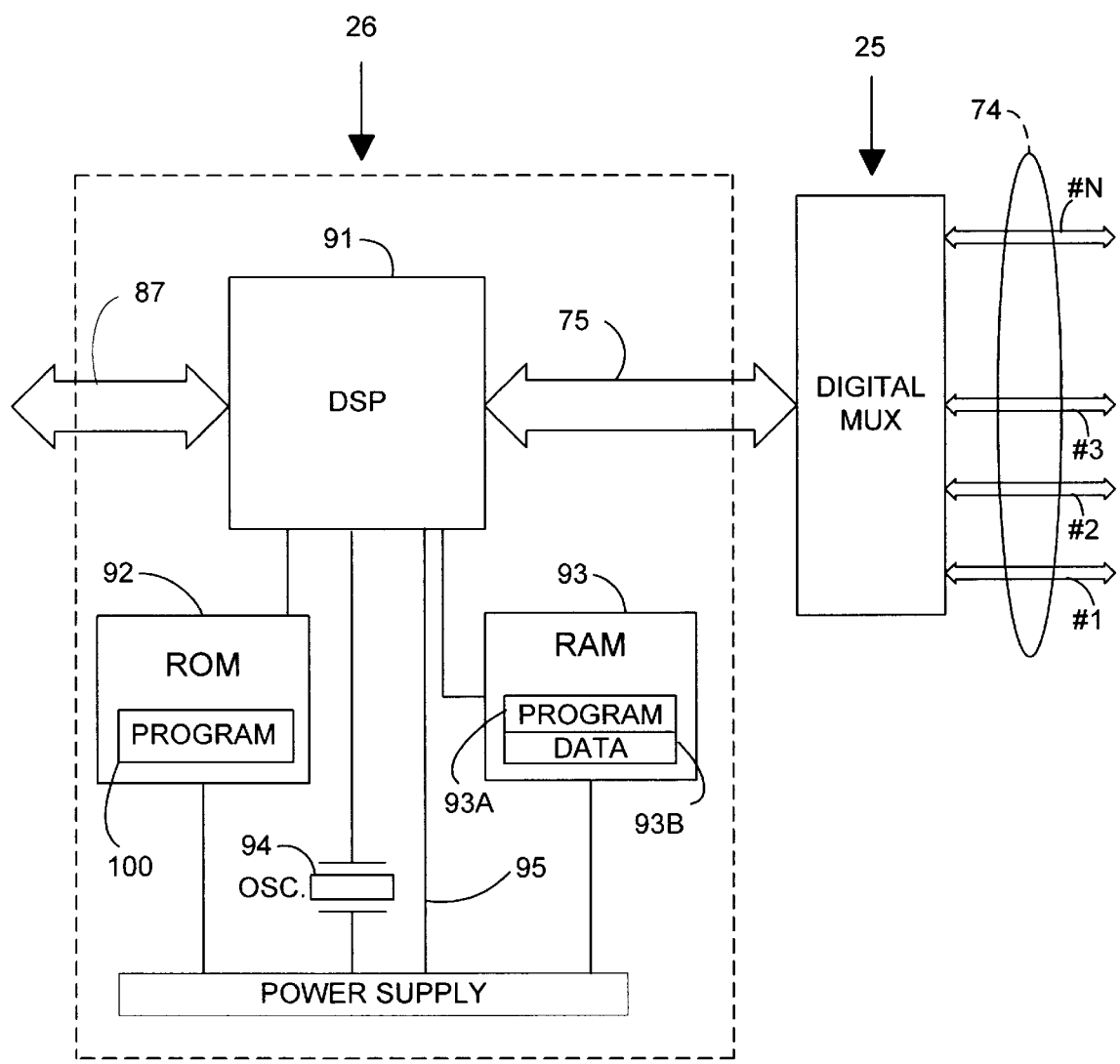
FIG. 5 is a block diagram of the digital mux and the DSP logic of FIG. 2.

As shown in FIG. 5, multiple digital communication links 74 are connected to a digital mux 25. The digital mux 25 allows multiple digital links 74 from multiple D/A and A/D logic 24 to connect one at a time to the DSP logic 26. Digital mux 25 accomplishes this by multiplexing the multiple digital links 74 into a single digital line 75, which is further connected to a single DSP 91 in the DSP logic 26.

DSP 91 is connected to read only memory (ROM) 92 and random access memory (RMA) 93. Those skilled in the art will recognize that DSP 91 can consist of any logic that can perform a digital signal processing function. ROM 92 can be comprised of either regular ROM or RAM memory, flash memories, erasable programmable read only memory (EPROMs), electrically erasable programmable read only memory (EEPROMs), or other suitable program storage memories. RAM 93 can comprise static or dynamic RAM or other suitable data storage memories. Oscillator 94 provides timing signals for the DSP 91. The DSP 91 acquires its power across line 95.

In the first embodiment, the operation routines 100 are in the digital signal processor logic 26 program ROM 92, or in the program RAM 93A. Operation routines can be downloaded from digital devices, usually the control processor 27, into the digital signal processor engine 26 program RAM 93A. It is in this way that an updated operation routine may be downloaded to the modem apparatus to update the operation of the apparatus.

Digital communication links 75 and 87 can comprise 8, 16, 32, 64, 128 or other bit sized digital parallel communication links. Communication links 75 or 87 can also comprise bit serial or other types of chip-to-chip signal communication links.

Illustrated in FIGS. 6A through 6D are the polling algorithms that allow DSP logic 26 to simultaneously support multiple local loops, even though its processing power does not support simultaneous modulation on all these local loops.

The modulation required for this invention is time division duplexing (TDD), whereby the transmission on a single local loop can only occur in one direction at a time. The specific version of TDD is a poll/response modulation, whereby the central-site modem controls which of the modems on a local loop is allowed to transmit. A "poll" is a transmission from the central-site modem, while a "response" is a transmission from a user premise modem 31. To avoid simultaneous transmissions on the line, a poll will always occur followed by a response. For cases in which a response has no data, "silence" is a legitimate response. The central-site modem 21 will recognize this as a response with no data. In the simple case, two modems exist on the line—the central-site modem (FIG. 1, item 21) and the user premise modem 31 (FIG. 1). However, hose skilled in the art will recognize that poll/response modulation can allow multiple user premise modems to exist on the same local loop.

Figure 6A:
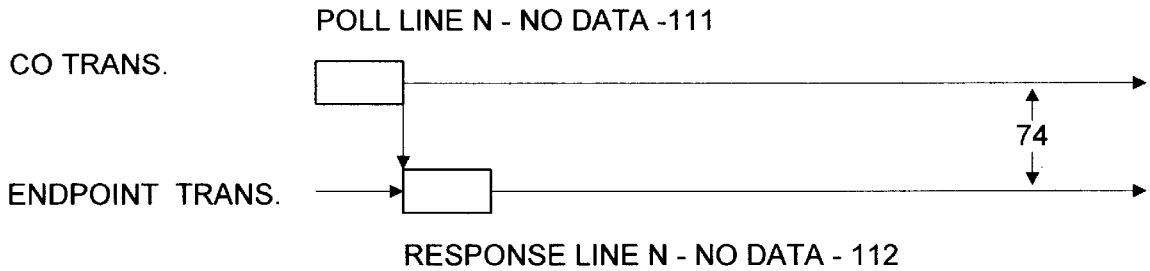
FIGS. 6A to 6B are graphs showing the modes of poll and response modulations that are placed on the local loop by the DSP logic in FIG. 5; more particularly.

FIGS. 6A through 6D graphically show four respective modes for the poll/response cycle:

FIG. 6A shows a poll with no user data step 111, followed by a response with no user data step 112.

Figure 6B:
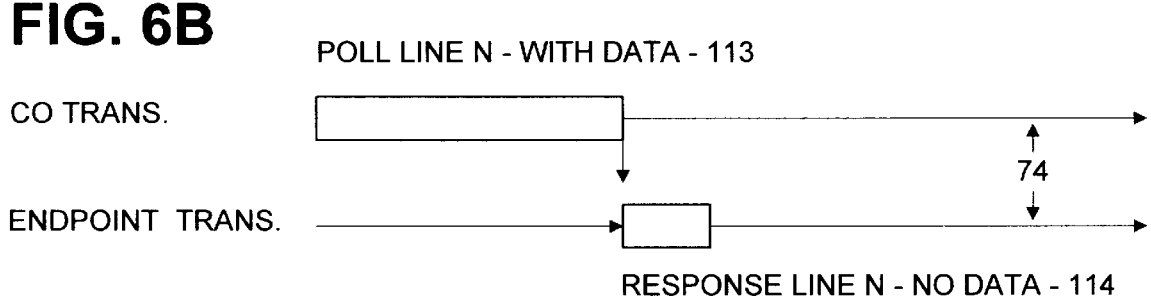

FIG. 6B shows a poll with user data at step 113, followed by a response with no user data at step 114.

Figure 6C:
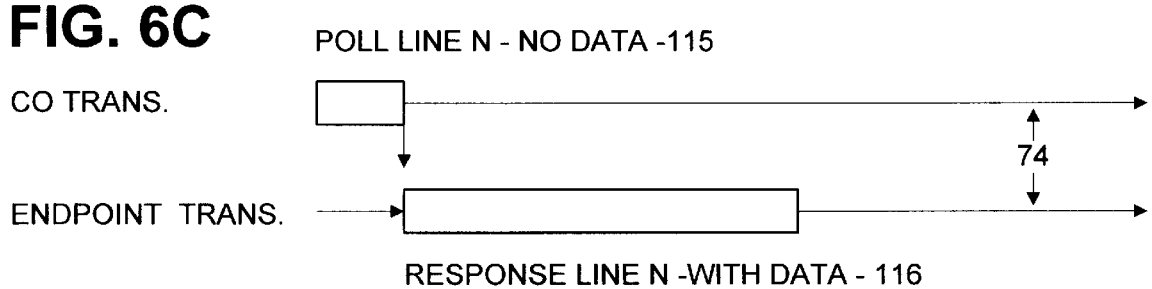
FIG. 6 A shows a poll with no user data, followed by a response with no user data.

FIG. 6C shows a poll with no user data at step 115, followed by a response with user data at step 116.

Figure 6D:
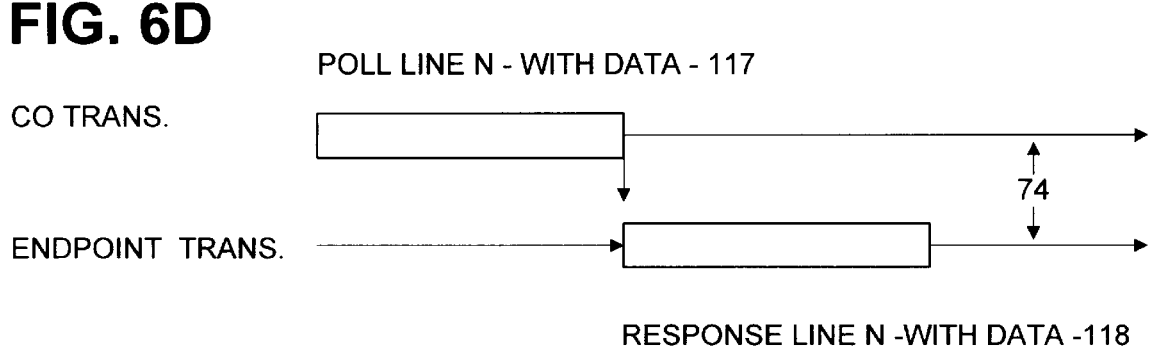

FIG. 6D shows a poll with user data at step 117, followed by a response with user data at step 118.

The burstiness of Internet data typically will result in most poll/response cycles being one of the modes that does not contain user data in at least one direction. Since polls and responses with no data take less time to complete a cycle, the DSP transmitting these polls and receiving these responses will use less overall processing power for these modes. The DSP will spend most of the time (and therefore most of its processing power) servicing poll/response cycles that contain user data. Indeed, the more user data in a cycle, the more DSP processing power consumed over time. It is this property that allows a low processing power DSP to effectively provide full user throughput to multiple local loops, even though it does not have the processing power to simultaneously support all the local loops.

Referring to FIG. 7, illustrated is a flow chart of the process for the initializing the operation of polling routines residing in the DSP logic 26 (FIG.5), ROM 92 memory program area 100 or RAM 93 memory program area 93A. First, the polling selection routine is initialized within the DSP logic 26 (FIG.5) in step 121. Next, a general initialization of the transmit and receive operation routines is performed in step 122. Initialization of the modem apparatus further continues by initializing the requested type of user polling routine in step 123. If round robin polling is requested, the DSP sharing with round robin polling routine is performed at step 125. The DSP sharing with round robin polling routine will be explained in detail hereinafter with reference to FIG. 8. Otherwise, the DSP sharing with quality of service routine is performed at step 127. The DSP sharing with quality of service routine will be explained in detail hereinafter with reference to FIG. 9. This process allows a user to set which routine (i.e. DSP sharing with round robin polling or the DSP sharing with quality of service) is desired.

Figure 8:
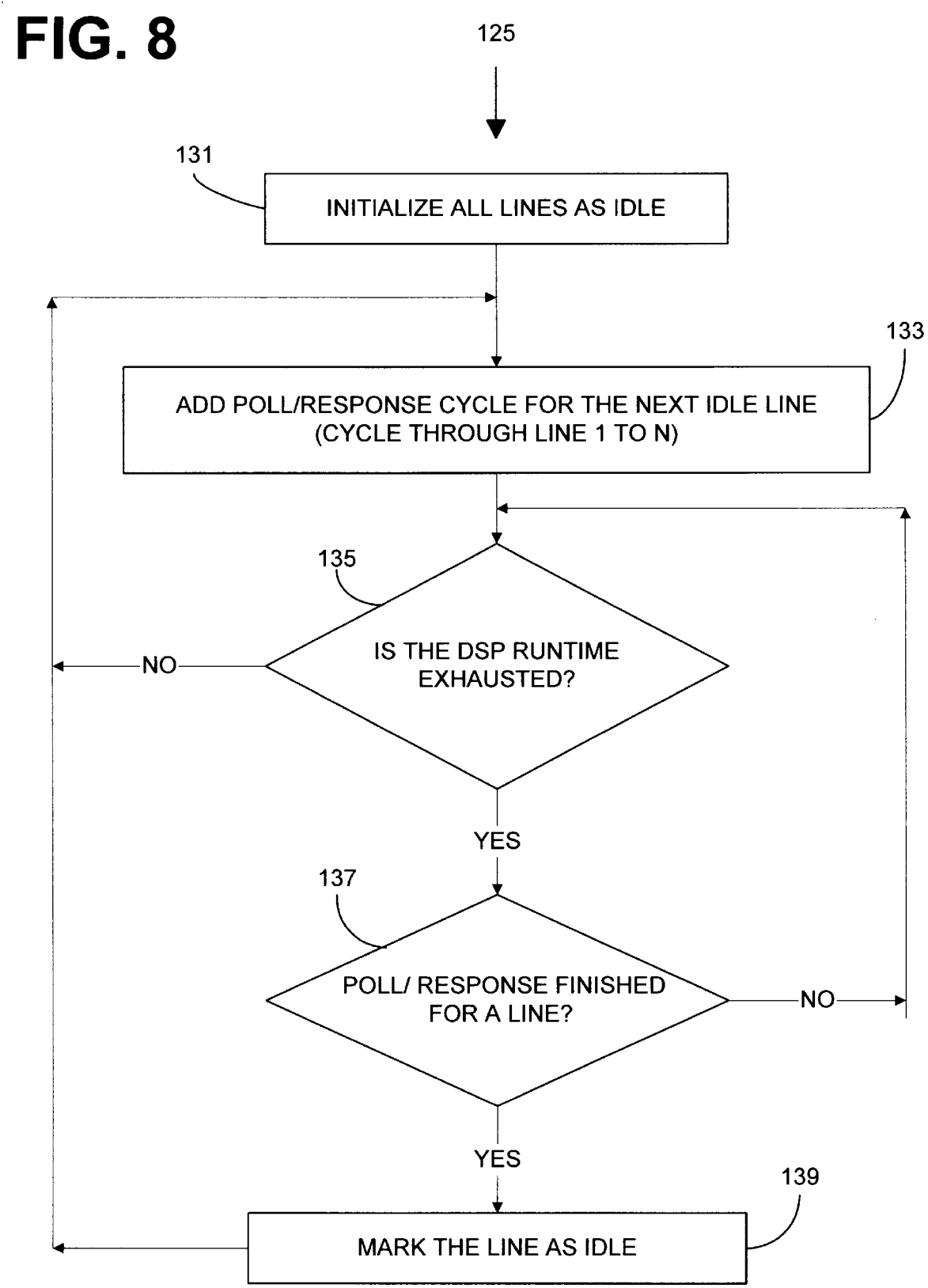
FIG. 8 is a flow chart of a process for the round robin polling algorithm in the DSP of FIG.5.

FIG. 8 shows a round robin polling routine that supports this invention. The servicing algorithm is "round robin", where all local loops are treated equally. It is assumed that there are a plurality of "N" local loops, and that the DSP has the necessary run time to simultaneously support poll/response cycles on some number of local loops that total less than "N". It is assumed that the DSP knows its run time capabilities in advance. The DSP will try to maximize its efficiency by simultaneously supporting as many local loops as it is capable of supporting.

The round robin polling routine begins with initialization of all lines as idle at step 131. Next, the routine enters the first step in the processing loop which activates a poll/response cycle for the next idle line in a queue of lines (not shown) requiring service at step 133. An idle line is defined as an idle local loop without a current active poll or response.

If the DSP logic 26 (FIG.5), determines that there is available processing run-time to support an additional poll/response cycle for the next idle line, at step 135, the routine loops-back to repeat steps 133, to add a poll/response cycle for the next idle line. If the DSP logic 26 (FIG.5), determines that there is no available run-time processing to support an additional poll/response cycle for the next idle line, at step 135, the routine proceeds to step 137 to determine if a local loop has finished a poll/response cycle.

When the DSP logic 26 (FIG.5), determines that a Poll/Response cycle is finished for a local loop, at step 137, the DSP logic will mark the finished local loop as idle, at step 139, and loop-back to repeat steps 133, to service the next idle local loop. If the DSP logic 26 (FIG.5), determines that no local loop has finished its poll/response cycle at step 137, then the routine loops-back to repeat step 135, to determine if there is available run-time processing to support an additional poll/response cycle for the next idle line.

There is some probability that the total amount of user data that needs to be sent across all the local loops will exceed the run-time of the DSP. The probability of this occurring depends on the processing power of the DSP and how many local loops it is servicing. When the run time of the DSP is exceeded, all users will experience a slow down in data.

This invention realizes that most applications that run on the Internet are not impacted by a slow down of data—the user will simply experience a degradation of performance. However, some real time applications such as video telephony and voice telephony can be impacted by a slow down of data. To address the needs of these applications, the round robin polling routine of FIG. 8 can be modified to add quality of service (QoS) of FIG. 9, providing a higher QoS for real time applications.

Figure 9:
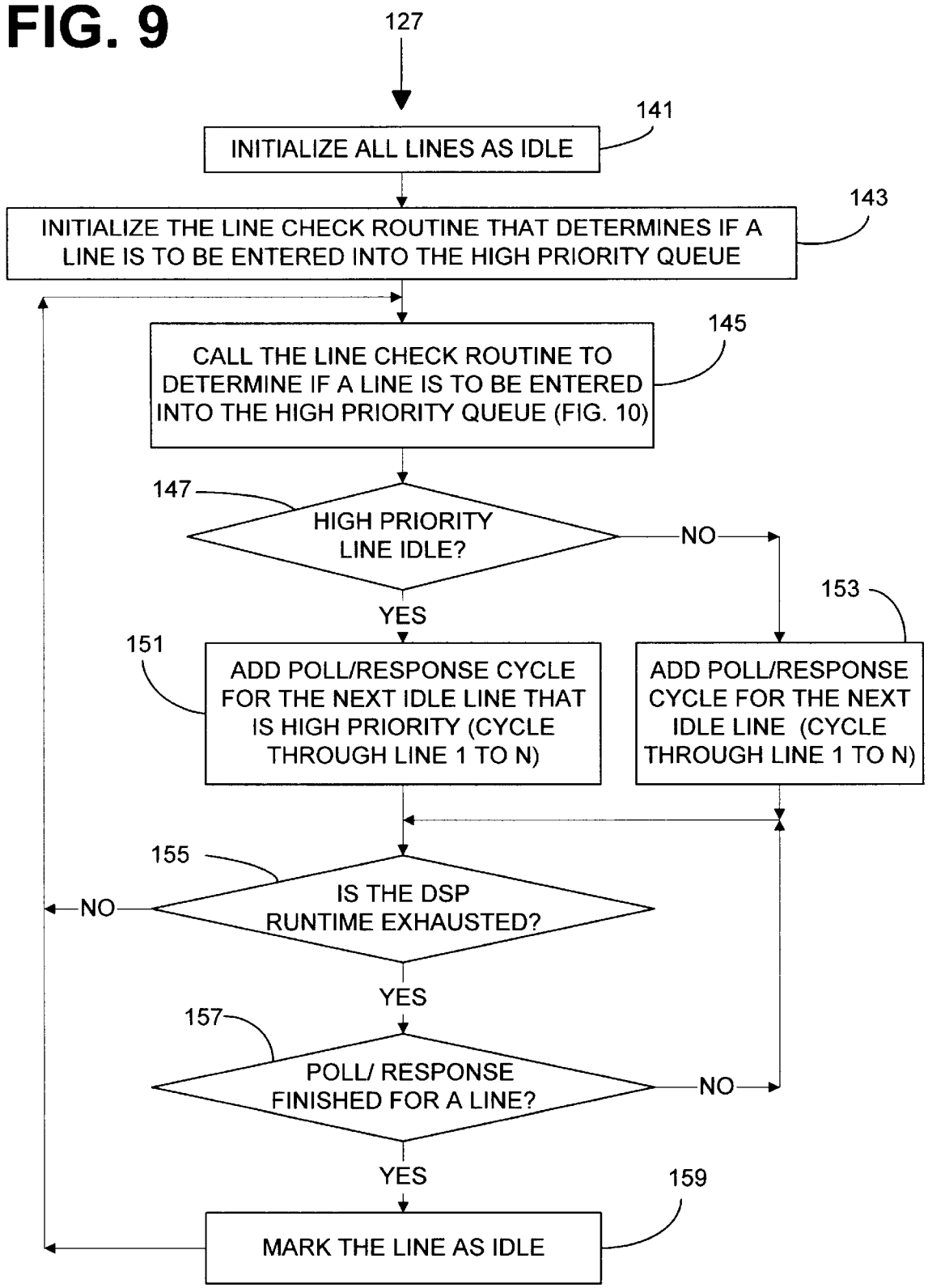
FIG. 9 is a flow chart of a process for the quality of service polling algorithm residing in the DSP of FIG. 5.

FIG. 9 shows a flow chart of a modified polling routine that supports quality of service. In this routine, all local loops are not treated equally. Certain local loops are designated as high priority. In this process, when the DSP has additional processing resources to add support for a local loop, the high priority local loops are supported first.

The QoS polling routine begins with initialization of all lines as idle at step 151. Next, the QoS polling routine initializes the high priority check routine at step 143. Then, the routine enters the first step in the processing loop which calls the high priority check routine at step 145, to determine if there are any poll/response active lines that require high priority. The high priority check routine is explained in detail hereinafter with reference to FIG. 10.

A test is performed by the DSP logic 26 (FIG.5), at step 147, to determine if there are any high priority lines that are idle. If the DSP logic 26 (FIG.5), determines that there are lines marked high priority that are idle, the DSP logic 26 (FIG.5), activates a poll/response cycle for the next idle line in the high priority queue of lines (not shown) requiring service at step 151. If the test performed at step 147 determines that there are no high priority lines idle, then the DSP logic 26 (FIG.5), activates a poll/response cycle for the next idle line in the normal priority queue of lines (not shown) requiring service at step 153.

After processing either step 151 or 153, the DSP logic 26 (FIG.5), then determines that there is available run-time processing to support an additional poll/response cycle for the next idle line, at step 155, the routine loops-back to repeat steps 145 through 155, to add a poll/response cycle for the next high/normal idle line.

If the DSP logic 26 (FIG.5), determines that there is no available processing run-time to support an additional poll/response cycle for the next high/normal idle line, at step 155, the routine proceeds to step 157 to determine if a local loop has finished a poll/response cycle.

When the DSP logic 26 (FIG.5), determines that a poll/response cycle is finished for a local loop, at step 157, the DSP logic will mark the finished local loop as idle, at step 159, and loop-back to repeat steps 145 through 155, to service the next high/normal priority idle local loop. If the DSP logic 26 (FIG.5) determines that no local loop has finished its poll/response cycle at step 157, the routine loops-back to repeat step 155, to determine if there is available processing run-time to support an additional poll/response cycle for the high/normal priority next idle line.

There are many ways that a local loop can be designated as high priority. For example, the application can notify the DSP logic 26 (FIG.5), via some setup channel. Those skilled in the art know of several ways to accomplish this via a setup channel—class of service selection in an asynchronous transfer mode (ATM), virtual circuit (VC), resource reservation protocol (RSVP) in internet protocol (IP), etc.

Figure 10:
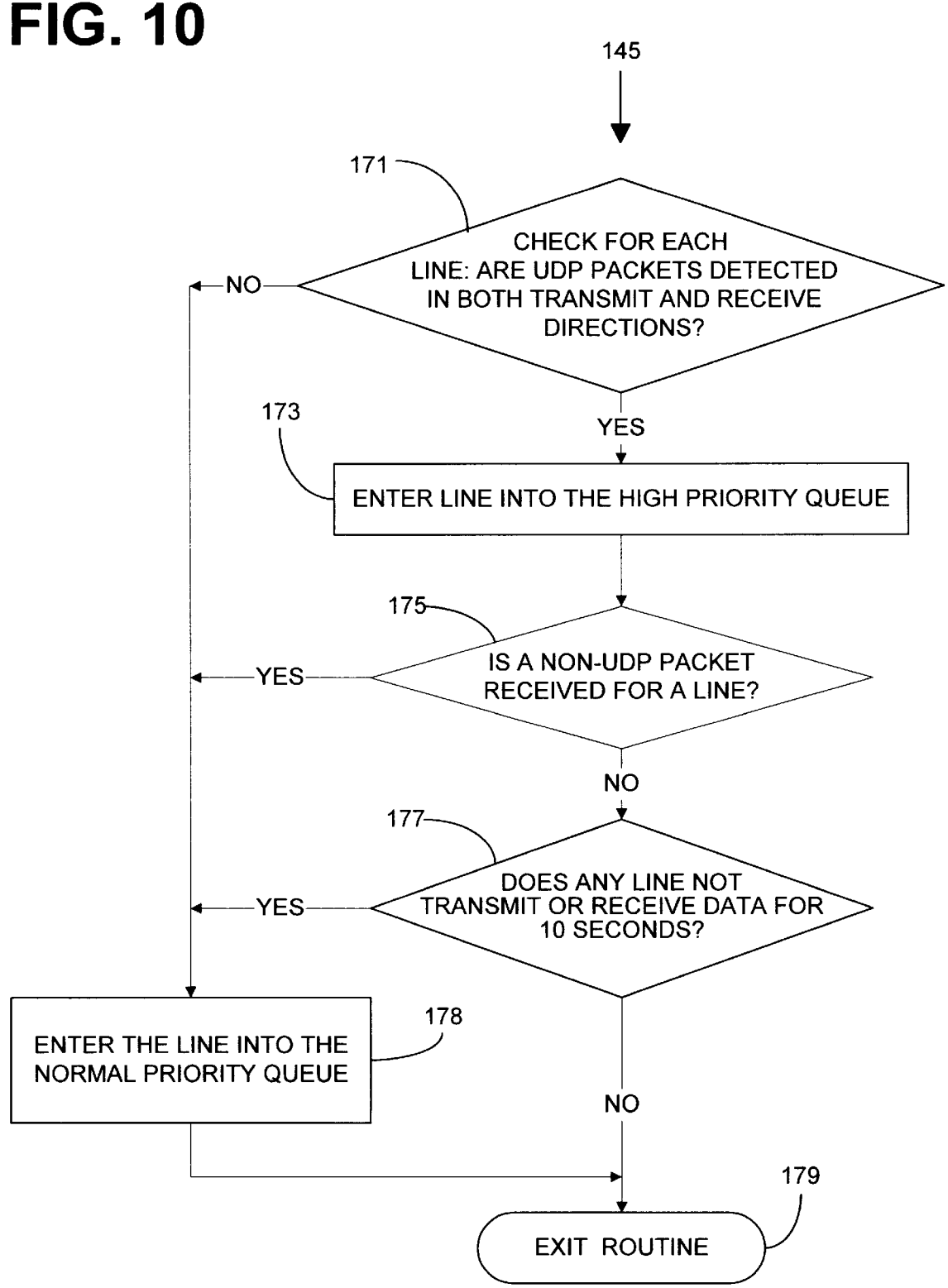
FIG. 10 is a flow chart of the routine for checking each line to determine whether the local loop should be placed in the high priority queue, this information being used by the quality of service polling algorithm of FIG. 9, this routine residing in the DSP logic of FIG. 5.

This invention realizes that a setup channel to indicate high priority may not implemented. This invention presents a novel way of determining which local loops should be designated as High Priority. FIG. 10 shows this routine.

FIG. 10 shows an invention that depends on the property that the "transport layer" usually indicates which applications are real time. The information that indicates the type of transport layer is available in a field in the network layer (i.e. IP) packet (not shown). Typically, the transport layer is either user datagram protocol (UDP) or transmission control protocol (TCP), though other transport layers are possible. This invention depends on the property that real-time applications use UDP as the transport layer. Indeed, the most time critical applications (video telephony and voice telephony) will have UDP traffic flowing simultaneously in both directions. Applications (such as video streaming and audio streaming) with UDP in one direction only can tolerate some delay and are not considered real-time for purposes of the QoS algorithm.

The Central-site modem can monitor traffic in both directions. As shown in FIG. 10, if the DSP logic 26 (FIG.5), detects UDP traffic in both directions on one line (i.e. local loop) at step 171, the DSP logic 26 (FIG.5), designates that line as high priority at step 173. If after marking a line as a high priority line, a non-UDP packet is then received for that line at step 175, then that local loop marked designation reverts to a normal priority line at step 178. If after marking a line as a high priority line, the data stops flowing in either direction for a preset period of time at step 177, then that local loop designation also reverts to a normal priority line at step 178.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A data communications apparatus for supporting multiple users simultaneously, said data communications apparatus comprising:
   a plurality of analog-to-digital and digital-to-analog converters connectable to a plurality of local telephone lines;
   a signal processor circuitry connected to said plurality of analog-to-digital and digital-to-analog converters; and
   said signal processor circuitry utilizing a modulation circuitry to independently modulate and demodulate a subset of said plurality of local telephone lines at the same time, said signal processor circuitry lacking the processing power to support independent modulation and demodulation to all of said plurality of local telephone lines simultaneously, wherein said modulation circuitry utilizes a half duplex poll/response technique, and a selection criteria that provides higher priority to local lines, in said subset of said plurality of said local telephone lines, running real time applications.

2. The apparatus of claim 1, wherein said half duplex poll/response modulation technique utilized by said modulation circuitry, is round robin polling for said plurality of said local telephone lines is not running said real time application; and
   wherein said modulation circuitry utilizing said half duplex poll/response modulation technique and said round robin polling, provides equal priority to all local lines in said subset of said plurality of said local telephone lines.

3. The apparatus of claim 1, wherein said signal processor circuitry further comprises:
   a circuitry that selects said local telephone lines utilizing user datagram protocol simultaneously in both directions and designates said local telephone lines utilizing user datagram protocol simultaneously in both directions as a high priority subset of said plurality of said local telephone lines.

4. A method for use in data communications apparatus, said data communications apparatus including a plurality of local telephone loops connected to a plurality of analog-to-digital and digital-to-analog converters, which are all connected to a signal processor circuitry, the method comprising the steps of:
   providing independent modulation and demodulation to a first subset of said plurality of said local telephone loops utilizing a half duplex poll/response technique;
   providing processing power that lacks an ability to support said independent modulation and demodulation to all said connected plurality of local telephone loops simultaneously; and
   providing a selection criteria that provides higher priority to local loops, in said first subset of said plurality of said local telephone loops, running real time applications.

5. The method of claim 4, wherein the step of providing a selection criteria includes the step of:
   providing equal priority to all local loops in said first subset of said plurality of said local telephone loops for said plurality of said local telephone lines is not running said real time application.

6. The method of claim 4, wherein the step of providing a selection criteria includes the steps of:
   selecting said local telephone loops utilizing user datagram protocol simultaneously in both directions; and
   designating said local telephone loops utilizing user datagram protocol simultaneously in both directions as a high priority subset of said plurality of said local telephone loops.

7. Data communications apparatus comprising:
   a means for converting signals from analog-to-digital and digital-to-analog, said converting means connectable to a plurality of local telephone loops;
   a means for providing independent modulation and demodulation to a first subset of said plurality of local telephone loops;
   a means for providing processing power that lacks the ability to support said independent modulation and demodulation to all of said plurality of local telephone loops simultaneously; and
   a means for providing a selection criteria granting higher priority to local loops, in said first subset of said plurality of local telephone loops, running real time applications.

8. The apparatus of claim 7, wherein said processing power means utilizes a half duplex poll/response technique.

9. The apparatus of claim 7, further comprising:
   a means for providing equal priority to all local loops in said first subset of said plurality of local telephone loops for said plurality of said local telephone lines is not running said real time application.

10. The apparatus of claim 7, wherein said selection criteria providing means further comprises:
    a means for selecting said local telephone loops utilizing user datagram protocol simultaneously in both directions; and
    a means for designating said local telephone loops utilizing user datagram protocol simultaneously in both directions as a high priority subset of said plurality of local telephone loops.

11. A computer program product for directing a data communications apparatus operation of modem sharing, said program product comprising:
    a computer readable recording medium;
    a means recorded on the medium for directing the data communications apparatus to provide independent modulation and demodulation to a first subset of a plurality of said local telephone loops; and a means recorded on the medium for supporting said independent modulation and demodulation to said first subset of said plurality of local telephone loops, when a processing power means lacks the ability to support said independent modulation and demodulation to all of said plurality of local telephone loops simultaneously, wherein said means for supporting said independent modulation and demodulation further comprises:

a selection criteria routine means, responsive to the means for supporting said independent modulation and demodulation, providing a selection criteria that grants higher priority to local loops, in said first subset of said plurality of local telephone loops, running real time applications.

12. The computer program product of claim 11, wherein the means for supporting said modulation and demodulation includes:

a first routine means, responsive to the means for supporting, for utilizing a half duplex poll/response technique.

13. The computer program product of claim 11, wherein the means for supporting said modulation and demodulation includes:

a second routine means, responsive to the means for supporting, for providing equal priority to all local loops in said first subset of said plurality of local telephone loops for said plurality of said local telephone lines not running a real time application.

14. The computer program product of claim 11, wherein the means for supporting said modulation and demodulation includes:

a fourth routine means, responsive to the means for supporting, for selecting said local telephone loops utilizing user datagram protocol simultaneously in both directions; and a fifth routine means, for designating said local telephone loops utilizing user datagram protocol simultaneously in both directions as a high priority subset of said plurality of local telephone loops.

* * * * *

UNITED STATES PATENT AND TRADEMARK OFFICE
CERTIFICATE OF CORRECTION

PATENT NO. : 6,084,885
DATED : July 4, 2000
INVENTOR(S) : Scott

It is certified that error appears in the above-identified patent and that said Letters Patent is hereby corrected as shown below:

Column 2, line 51, delete "6B" and substitute therefor
--6D--.

Column 5, line 52, delete "(RMA)" and substitute therefor --(RAM)--.

Column 6, line 29, delete "hose" and substitute therefor --those--.

Column 8, line 50, after "may not" insert --be--.

Signed and Sealed this

Twenty-second Day of May, 2001

*Attest:*

NICHOLAS P. GODICI

*Attesting Officer*      Acting Director of the United States Patent and Trademark Office